Jan. 12, 1971 G. J. CLARK 3,553,760
BRUSH STRUCTURE AND METHOD OF MAKING SAME
Filed March 13, 1969 3 Sheets-Sheet 1

INVENTOR.
GAYLORD J. CLARK
By
Woodhams, Blanchard & Flynn
ATTORNEYS

Jan. 12, 1971 G. J. CLARK 3,553,760
BRUSH STRUCTURE AND METHOD OF MAKING SAME
Filed March 13, 1969 3 Sheets-Sheet 2
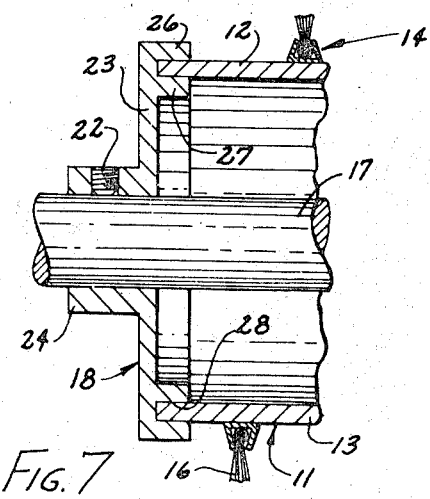
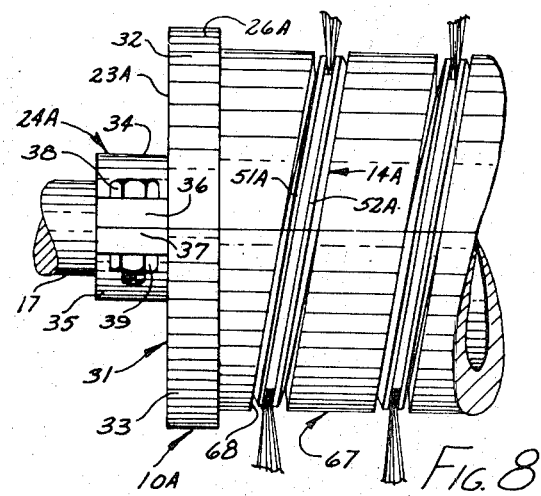
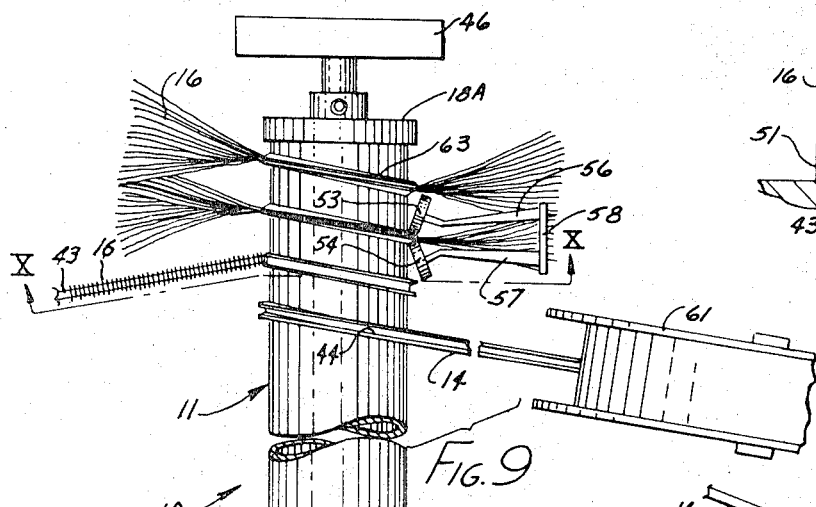
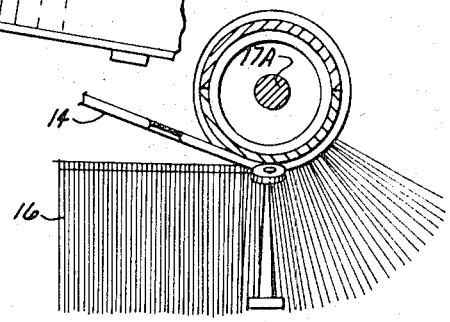
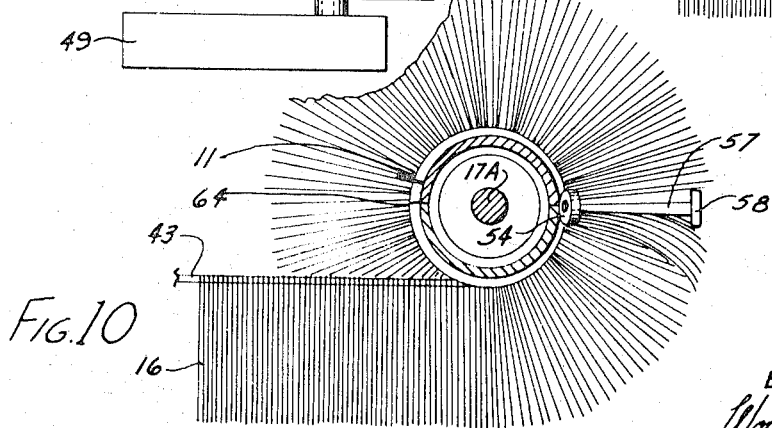
INVENTOR.
GAYLORD J. CLARK
By Woodhams, Blanchard & Flynn
ATTORNEYS Jan. 12, 1971  G. J. CLARK  3,553,760
BRUSH STRUCTURE AND METHOD OF MAKING SAME
Filed March 13, 1969  3 Sheets-Sheet 3

INVENTOR.
GAYLORD J. CLARK
BY
Woodhams, Blanchard & Flynn
ATTORNEYS

United States Patent Office 3,553,760
Patented Jan. 12, 1971

3,553,760
BRUSH STRUCTURE AND METHOD OF MAKING SAME
Gaylord J. Clark, P.O. Box 216, Coloma Township, Berrien County, Mich. 49038
Continuation-in-part of application Ser. No. 693,428, Dec. 26, 1967. This application Mar. 13, 1969, Ser. No. 807,008
Int. Cl. A46b 7/10
U.S. Cl. 15—182                          15 Claims

ABSTRACT OF THE DISCLOSURE

A rotary brush construction comprised of an elongated, channel-shaped member wrapped around a cylindrical core and rigidly secured thereto to form a plurality of closely spaced, spiral flights in which the brush elements are firmly seated. The method is carried out by cutting the core along a diametrical plane including the central axis of the core, either before or after the flights of the channel-shaped member are secured thereto, and mounting the channel-shaped member upon the core with the brush elements rigidly seated in said channel-shaped member.

CROSS REFERENCE TO RELATED APPLICATION

This application is a continuation-in-part of my copending application Ser. No. 693,428, filed Dec. 26, 1967 and entitled "Brush Structure," now Pat. No. 3,439,373, issued Apr. 22, 1969.

FIELD OF THE INVENTION

This invention relates in general to a rotary brush and, more particularly, to a type thereof designed for use in a car-washing opeartion. The invention also concerns an improved method of fabricating the brush construction of the invention.

BACKGROUND OF THE INVENTION

The sizes and shapes of automobiles and the types and locations of parts projecting therefrom, such as bumpers and the like, are constantly changing so that rotary brushes used in automatic devices for washing vehicles are frequently and seriously damaged under circumstances which cannot be adequately anticipated. Thus, it is of great importnat to provide brush constructions which can be quickly and easily, hence inexpensively, replaced and repaired in order to minimize losses of money and time, thereby increasing the efficiency in, and profit from, such car-washing operations.

It is equally important that such rotary brushes be capable of quick and easy removal and replacement where such is necessitated by the wear and tear of the brush bristles resulting from ordinary use.

Many attempts have been made to produce brushes meeting the foregoing qualifications and one such brush construction is disclosed in my Pat. No. 3,355,758. However, in a continuing effort to improve upon, and reduce the cost of, the procedure for replacing worn or damaged brushes or brush bristles, I found that much time could be saved by attaching the bristles to the core with a single spiral member to which te brush bristles are anchored.

Accordingly, a primary object of this invention is the provision of an improved rotary brush construction in which the brush bristles are mounted in an elongated bristle-anchoring member which is in turn wrapped in a spiral around a cylindrical brush core after which the core and anchoring member may be cut along a diametrical plane including the rotational axis of the core so that the two core halves can be quickly and easily mounted upon and between the end bells which are attached to the brush shaft.

A further object of this invention is the provision of an improved rotary brush construction wherein the bristle-anchoring member comprises an elongated channel-shaped member which is wrapped in an outwardly opening spiral around a cylindrical brush core, the channel-shaped member having a bottom wall the central portion of which is initially spaced from the core, the bottom wall being deformed to lie flush against the surface of the cylindrical brush core by forcing a cable against the bottom wall of the channel-shaped member, such inward deflection of the bottom wall causing the two flanges of the channel-shaped member to move inwardly toward one another and thereby clamp the brush bristles therebetween.

A still further object of this invention is the provision of a method whereby the aforesaid brush construction can be quickly manufactured and/or repaired.

Other objects and purposes of the invention will become apparent to persons familiar with rotary brush constructions upon reading the following descriptive material and examining the accompanying drawings, in which:

FIG. 7 is a sectional view taken along the line VII—VII in FIG. 2.

FIG. 8 is a fragment of a modified construction embodying the invention.

FIG. 9 is a broken, plan view of a rotary brush construction embodying the invention and the apparatus with which it is being fabricated.

FIG. 10 is a sectional view taken along the line X—X in FIG. 9.

FIG. 11 is a transverse, sectional view of FIG. 9 showing a modified apparatus for assembling the brushes.

FIG. 12 is a sectional view similar to FIG. 5 and showing a modified holder for the brush elements.

For convenience in description, the terms "inner," "outer" and words of similar import will have reference to the central axis of the rotary brush construction.

SUMMARY OF THE INVENTION

The objects and purposes of the invention, including those set forth above, have been met by providing a rotary brush having a core or a pair of core halves defining a cylindrical core encircled by plural spiral flights of an anchor member to which brush elements are secured and from which they preferably extend radially. The flights of the anchor member can be cut on both sides of the core along the plane between the halves thereof so that the core halves can be separated for quick removal from the shaft upon which they are mounted by a pair of end bells. The method of fabricating the brush structure comprises te attachment of an elongated, channel-shaped member upon the core halves in a single spiral, either during or after which the brush bristles are anchored in the channel member, and then cutting said channel-shaped member along the parting plane of the core halves. In an alternate form of the invention, the core is a solid cylinder and is cut into halves simultaneously with the cutting of the channel-shaped member.

The present invention further includes a rotary brush construction wherein the bottom wall of the channel-shaped anchor member, which encircles the cylindrical core, is initially spaced from the surface of the core and, thus, projects upwardly between the flanges of the channel-shaped member. The central portions of elongated brush bristles are pressed into the channel-shaped member by an elongated flexible member, such as a cable, which is tensioned so that it causes the bottom wall to be deformed against the peripheral surface of the cylindrical core, such deformation causing a simultaneous deflection of the channel flanges whereby the free edges thereof move toward one another and tightly clamp the bristles therebetween.

DETAILED DESCRIPTION

Figure 1:
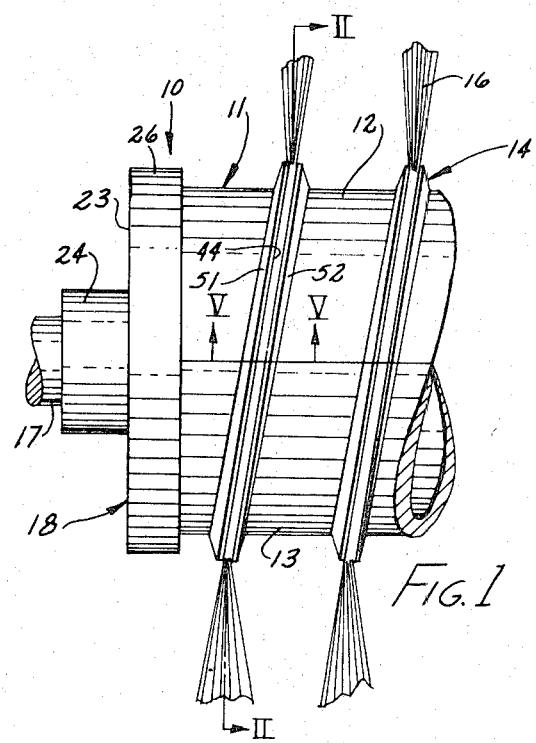
FIG. 1 is a fragment of a rotary brush construction embodying the invention.

The rotary brush construction of the invention, a preferred embodiment of which is illustrated at 10 in FIG. 1, is comprised of a cylindrical, preferably hollow core 11 having a pair of preferably identical core halves 12 and 13 around which the channel member 14 is wrapped for the purpose of anchoring a plurality of radially outwardly extending brush elements or bristles 16. The core 11 is mounted upon a shaft 17 by means of a pair of end bells similar to the end bell 18, which are supported upon the shaft 17 and firmly held against axial movement with respect thereto by set screws 22.

Figure 2:
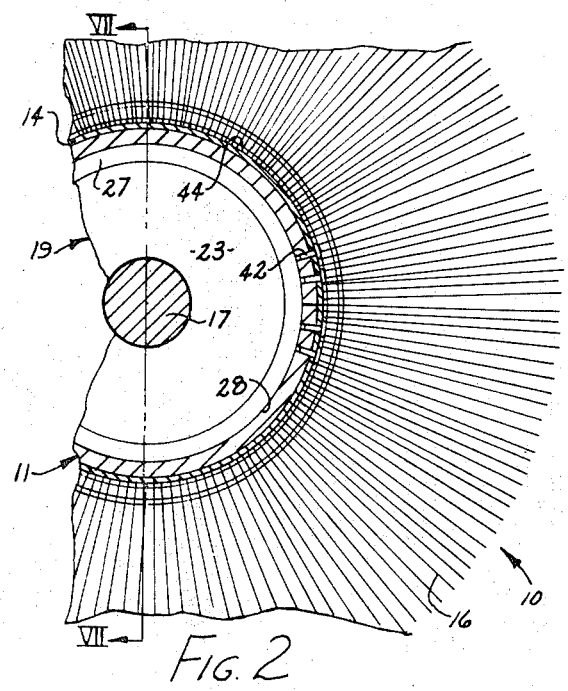
FIG. 2 is a fragmentary, sectional view taken along the line II—II in FIG. 1.

The end bell 18, by way of example and as shown in FIG. 7, has a diametrically disposed wall 23 which is integral at its inner end with a hub 24 through which the set screw 22 extends. A pair of spaced and concentric flanges 26 and 27 are integral with and extend axially inwardly from the diametrical wall 23 near its outer edge to define a groove 28 into which the axial end edges of the core halves 12 and 13 are snugly but removably received. A preferably identical end bell 19 (FIG. 2) is provided at the other end of the core 11.

If desired, the end bells 18 and 19 may be replaced by a split end bell 31 (FIG. 8) having upper and lower halves 32 and 33. The hub of end bell 31 is also split to provide upper and lower halves 34 and 35 having sidewardly extending flanges 36 and 37, respectively, on both sides thereof. The flanges 36 and 37 have aligned openings through which bolts 38 are received for engagement by nuts 39, whereby the two halves of the bell 31 are held firmly together and against movement with respect to shaft 17.

The core halves 12 and 13 may be fabricated from any suitable material such as wood, plastic or metal, and they are preferably hollow and relatively thin walled in order to minimize weight. The end bells 18, 19 and 31 may be fabricated from metal, such as aluminum, or a suitable plastic material, for example.

The channel member 14 (FIG. 9) is wrapped around the core 11, either before or after the core is split (as appearing in FIGS. 1 and 3), to provide a plurality of closely spaced spiral flights, each of which encircles the core 11. As the channel member 14 is thus wrapped around the core 11, it is rigidly secured to the core by means, such as the rivets 42 (FIG. 3), which are preferably located adjacent the parting plane between the core halves 12 and 13. Additional rivets may be used if desired. It will be recognized that the core 11 can be one-piece or comprised of three or more segments, instead of two, which are preferably joined along radial planes and held together by the end bells 18 and 19, for example.

An elongated cord or cable 43 (FIGS. 5 and 6) is anchored at one end thereof preferably within the initial end of the channel member 14 by any convenient fastening device, such as a screw (FIG. 3), which may also be used to secure the end of the channel member upon the core 11. A plurality of brush elements 16 (FIG. 10) are draped over the cable 43 which is then fed into the groove 44 defined by the channel member 14. During this assembling operation, the core 11 will normally be mounted upon a shaft 17 which is supported by bearings 46 and 47 so that one end of the shaft 17 can be engaged and rotated by an appropriate drive means 49.

Figures 5, 6:
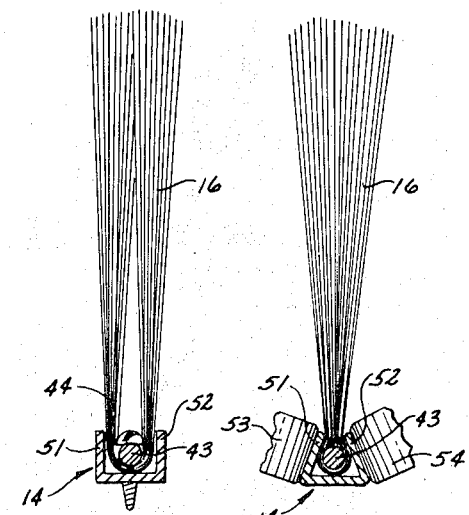
FIG. 5 is a sectional view of the channel-shaped member taken along the line V—V in FIG. 1.
FIG. 6 is a sectional view of said channel-shaped member before it is completed.

Following insertion of the cable 43 and brush elements 16 into the groove 44, the flanges 51 and 52 (FIG. 6) of the channel member 14 are engaged by a pair of rollers 53 and 54 (FIG. 9) which bend the flanges 51 and 52 toward each other, as shown in FIG. 5. The rollers 53 and 54 may be driven or may be freely rotatably mounted upon the spindles 56 and 57, which are held by the support 58.

As the channel member 14 is wrapped around the core 11, the flanges 51 and 52 thereof may tend to bend toward each other because of the tension applied thereto in the bending action. Under such circumstances, it will be desirable to have the cable 43 fed into the groove 44 (as appearing in FIG. 11) just as the bending of the channel member is about to occur. Thus, this induced bending of the flanges will not interfere with the feeding of the cable and brush elements into the groove 44.

As shown in FIG. 9 and 10, the brush elements 16 may be draped over the cable 43 by automatic machinery in a uniform pattern as the cable approaches the channel member. Moreover, the channel member can be applied to the core 11 from a large spool 61 of such material located adjacent the core and positioned to feed the channel member onto the core in a predetermined spiral. Furthermore, it may be desirable to mount plural pairs of core halves upon a splined shaft along with said halves, and their supporting end bells, can be moved axially as the shaft is rotated while the cable 43 and channel member 14 are fed from a relatively stationary source. In such case, the channel member and cable can move in an unbroken path from one pair of core halves to the next without material interruption in the assembling operation. Small end portions of the channel member can be trimmed automatically from the axial ends of the core halves to permit their reception by the end bells.

After the channel member 14, cable 43 and brush elements 16 have been applied to and mounted upon the core 11, the flights 63 of the channel member 14 may be cut, by means such as a circular saw 62 (FIG. 3), along the parting line between the two core halves 12 and 13. However, since this cutting operation will normally remove a small portion of each flight, it is advantageous to place a thin spacer 64, approximately the thickness of the cut made by the saw 62, between the core halves prior to commencement of the assembly operation. Thus, after the flights 63 are cut, the spacer 64 can be removed and the cylindrical shape of the overall brush structure will be preserved.

Figure 4:
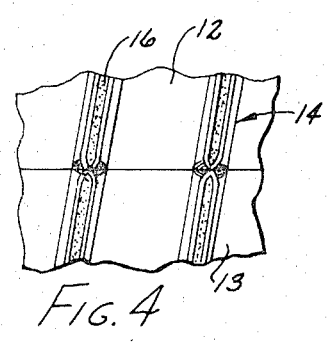
FIG. 4 is a fragment of FIG. 1 showing a further step in the fabrication of said brush construction.

The cut ends of the flanges 51 and 52 may be pinched tightly together as shown in FIG. 4 to prevent accidental dislodgement of the brush elements 16 from within the groove 44 adjacent the cut ends of the member 14 when the core halves are in their unassembled positions.

It will be recognized that the channel member 14 can be secured to the outer surface of the core 11 by the use of a strong cement or other adhesive, in place of the rivets. Moreover, it will also be recognized that the cable 43 and/or the inner ends of the brush elements 16 can be firmly held within the channel member 14 by other means, such as a cement or adhesive. The channel member 14 may be welded to the core 11, where both are metallic.

It will also be seen that the channel member 14 can be wrapped around and secured to the core 11 before it is split into the core halves 12 and 13. Thus, the cutting of the flights 63 can be combined with the cutting of the core 11 to provide the core halves at the same time. Moreover, under some circumstances, it may be desirable to provide a one-piece core having an uncut channel member.

Figure 3:
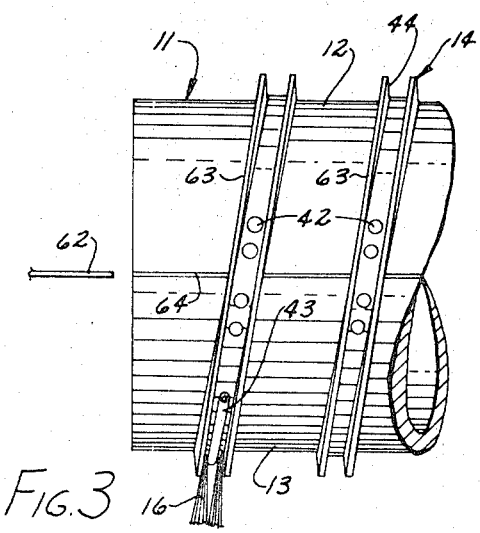
FIG. 3 is a fragment of said rotary brush construction when it is partially fabricated.

As an alternate construction, the core 67 of FIG. 8 is provided with a spiral groove 68 into which the channel member 14A is received during the assembly operation and held by any convenient means such as the rivets shown in FIG. 3 or a suitable cement. Since it would be difficult to perform the bending operation upon the flanges 51A and 52A by roller means after the channel member 14A is disposed within the groove 68, such flange bending would advantageously be performed before the insertion of the channel member within the groove. In all other respects, the structure and the method of assembly for the rotary brush 10A (FIG. 8) would be the same as described above with respect to the rotary brush 10 (FIG. 1).

It would also be possible to use a core 11 which is substantially solid, rather than substantially hollow, as shown. In such case, the shaft could extend through a relatively small axial opening through the core, and the anchor bolts could extend through the core halves instead of the end bells.

OPERATION

Although the operation of the brush construction and the carrying out of the method described above will be apparent to persons skilled in the art from a reading of the foregoing description, a summary thereof will now be set forth.

The core 11, which may be in a single piece or several segments, is mounted upon structure for rotation around its central axis. In one preferred embodiment, the core will first be cut into halves. A suitable spacer 64 is placed between the core halves as they are mounted on an assembly shaft 17A between a pair of assembly end bells 18A and 19A in preparation for wrapping the channel member 14 around the core. The channel member 14, the cable 43 and the brush element 16 will then be applied to the core halves, as described above, following which the flights of the channel member 14 are cut along the parting line of the core halves and the cut ends of the flights are pinched together as shown in FIG. 4.

All of the foregoing operataions can be performed on the channel member while it is mounted upon and between the end bells 18A and 19A. In order to allow for the gap between the core halves provided by the spacer 64, the end bells 18A and 19A used during the assembling operation are over-sized. Thus, the core halves will be held tightly together at their parting line when they are engaged by the standard end bells 18 and 19 with which they are actually used. Where split end bells 31 (FIG. 8) are used, the spacer can extend between the halves 32 and 33 during the assembling operation so that special assembly end bells will not be required.

The core halves and end bells will be mounted upon a shaft 17 during normal operation in substantially the same manner as they are mounted upon shaft 17A when the rotary brush 10 is being formed. Thus, damaged or worn core halves can be quickly and easily replaced merely by loosening the set screw on one of the end bells and moving it away from the core halves. A new core half or pair of core halves can then be quickly replaced between the end bells after which the loosened end bell is returned to its normal core-engaging position and its set screw is tightened upon the shaft. The repaired rotary brush is then ready for operation with a minimum loss of time. The damaged or worn core halves can be returned to the factory for repair.

As shown by the modified structure of FIG. 12, the brush elements 16 may be pre-assembled in a small channel member 70 which is then inserted into the larger channel member 14 during the assembly of the complete brush. The elements 16 may be held in the channel member 70 by the cable 43 and by crimping the flanges of the channel member 70 against the cable.

The modified structure of FIG. 12 can be assembled by winding the channel member 14 onto the core 11 and then securing the member 14 to the core, as described above. Thereafter, the channel member 70 is fed into the channel member 14 and the side flanges 51 and 52 are crimped toward each other. The core 11, whether one piece or precut in segments, is then cut, whereby the channel members 14 and 70 are cut, to form the core segments. Pinching of the cut ends of said channel members may be desired to obstruct further the escape of the brush elements from the channel members.

MODIFICATIONS

FIGS. 13–19 illustrate modifications of the channel-shaped anchor member which permit the flanges of the member to be automatically crimped or deformed into clamping engagement with the bristles as the bristles and holding cord or cable are positioned in the channel member, thereby eliminating the need of performing a separate rolling or crimping operation upon the channel flanges as in the embodiment illustrated in FIG. 9.

Secured on the circumferential periphery of the cylindrical core 111 is a channel-shaped anchor member 114 (FIG. 13) is secured to and encircles the core 111, which may be solid or hollow and split or one-piece, to provide a plurality of closely spaced spiral flights in the manner illustrated in FIG. 1. Further, if desired, the channel-shaped member can be positioned within a spiral groove formed in the periphery of the core substantially as illustrated in FIG. 8.

The channel-shaped member 114 includes a pair of flanges 116 and 117 integral with the bottom wall 118, which is initially adapted to engage the periphery of the core 111 along the lateral edges of said wall 118. That is, the central portion of the wall 118 is preferably curved so that it is spaced from the core surface and projects up between the flanges 116 and 117. In the embodiment illustrated in FIG. 13, the flanges 116 and 117 are initially substantially parallel.

Figure 14:
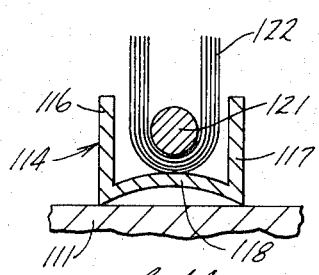
FIG. 14 is a further sectional view of the anchor member illustrated in FIG. 13 and showing the positioning of the bristles therein.

The brush construction utilizing the channel member 114 is assembled by positioning an elongated cord or cable 121 within the channel-shaped member as illustrated in FIG. 14. One end of the cable 121 is preferably anchored within the initial end of the channel member 114 by any convenient fastening device, such as a screw, which may also be used to secure the end of the channel member 114 to the core 111. A plurality of brush elements 122 are draped over the cable 121, which is then fed into the groove 123 defined by the channel member 114. This assembly operation is substantially the same as illustrated in FIGS. 9 and 10 and as explained in detail above.

During insertion of the cable 121 and brush elements 122 into the groove 123, sufficient tension is applied to the cable 121 to produce a radially inwardly directed force against the bottom wall 118 to deform or deflect it into substantially flush, tight engagement with the periphery of the core 111. The force imposed by the cable 121 also presses the channel member 114 tightly against the core 111 and holds the mid portions 126 of the bristles 122 tightly against the bottom wall 118.

Figure 15:
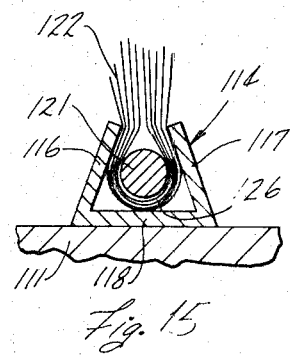
FIG. 15 is a sectional view similar to FIG. 14 but illustrating the bristles after they have been securely clamped within the anchor member.

A further and more significant advantage which directly results from the force imposed on the cable 121 is the resultant deflection of the flanges 116 and 117 toward one another to grip the bristles and cable in a manner similar to that illustrated in FIG. 15.

Figure 16:
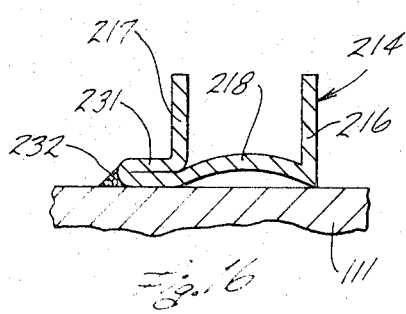
FIG. 16 is a sectional view of a modification of the channel-shaped anchor member illustrated in FIG. 13.

FIG. 16 illustrates a channel-shaped anchor member 214 which has a pair of parallel flanges 216 and 217 integral with a bottom wall 218, the channel 214 thus being substantially identical to the channel 114, described above.

However, the channel 214 also has a mounting flange 231 integral with the bottom wall 218 of the channel member 214 and projecting laterally of the flange 217. The flange 231 lies flush against the periphery of the core 11 as the channel member 214 is wound thereon. The channel member 214 is secured to the core 111 by securing the flange 231 to the core by any suitable means, such as welding 232 or screws (not shown).

Where the channel member 214 is shaped from sheet stock, the flange 231, as illustrated in FIG. 16, is preferably of double thickness. However, it will be obvious that the flange 231 can be formed in other ways while still producing the same results. The brush construction utilizing the channel member 214 illustrated in FIG. 16 is assembled in the same manner as explained above relative to the embodiment of FIGS. 13-15.

Figure 17:
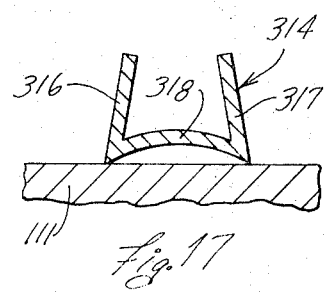
FIG. 17 is a sectional view of a further modification of the channel-shaped anchor member.

FIG. 17 illustrates a channel-shaped anchor member 314, which has opposed flanges 316 and 317 connected to an arched bottom wall 318. The channel member 314 is identical to the channel member 114 described above except that the flanges 316 and 317 are initially formed to diverge toward one another away from the wall 318. This initial relationship between the flanges 316 and 317 minimizes the amount of deflection which is required of said flanges to exert a tight clamping or gripping action on the brush bristles 122 when the bottom portion 318 is deflected toward the core 111. However, it may necessitate an initial, slight outward deflection of said flanges when the cable and bristle are inserted therebetween.

Figure 18:
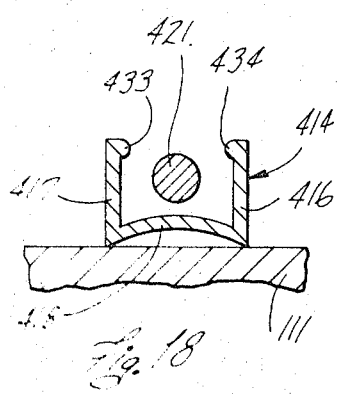
FIG. 18 is a cross sectional view of a further modification of the channel-shaped anchor member.
Figure 19:
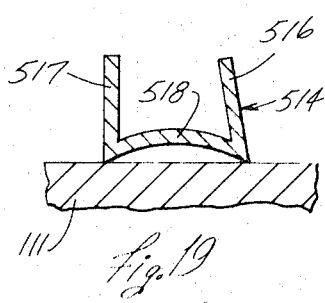
FIG. 19 is a sectional view of another modification of the channel-shaped anchor member.

The channel member 414 of FIG. 18 comprises substantially parallel flanges 416 and 417 connected to an arched bottom wall 418. Up to this point, the channel member 414 is identical to the channel member 114, illustrated in FIG. 13. However, the flanges 416 and 417 have opposed, inwardly projecting beads 433 and 444 adjacent the free edges thereof, which overlay the cable 421 to provide more effective clamping of the brush bristles 122 therebetween when the flanges 416 and 417 are deflected towards one another during the assembly operation. The beads 433 not only reduce the clearance between the free edges of the flanges 416 and 417, but they also improve the contact area between the flanges and the brush bristles.

Figure 13:
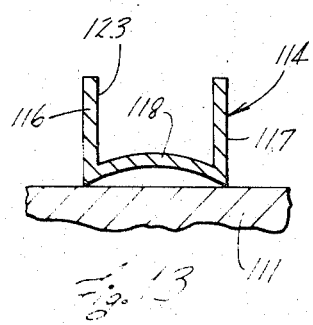
FIG. 13 is a sectional view of a modification of the channel-shaped anchor member used for securing the bristles to the brush core.

The channel-shaped anchor member 514 (FIG. 19) represents a combination of channel members 114 and 314 illustrated in FIGS. 13 and 17, respectively. In particular, channel member 514 is provided with a pair of flanges 516 and 517 connected to an arcuate bottom wall 518. The flange 517 is initially perpendicular to the axis of the core 111, and the flange 516 initially converges outwardly slightly with flange 517.

The channel-shaped members (FIGS. 13-19) described above are highly desirable because their flanges are bent inwardly toward one another to clamp the brush bristles therebetween in the same operation by which the bristles and cable are assembled with the channel member, thereby eliminating the need to perform a separate operation for clamping the flanges together or for securing the bristles in place. This thus simplifies the overall assembly operation and results in a brush structure which maintains the individual brush bristles more securely and prevents accidental dislodgement of the bristles due to failure or breakage of the cable.

Under some circumstances, the large channel 14 (FIG. 12) may be comprised of spaced segments of relatively short length secured to the outer surface of the core 11 and arranged so that the grooves therein define a spiral path around the core. The small channel 70 is then placed in the spaced segments after which the flanges 51 and 52 are crimped toward each other to secure the small channel 70 in place. Accordingly, by appropriate locating of the segments of channel 14 on the core 11, the core can be cut into halves, either before or after the segments are attached, without disturbing their attachment, or that of the channel 70.

Although particular preferred embodiments of the invention have been described above for illustrative purposes, it will be understood that variations or modifications of the disclosed apparatus, including the rearrangement of parts, lie within the scope of the present invention.

The embodiments of the invention in which I claim an exclusive property or privilege are defined as follows:

1. A method of fabricating the segments of a rotary brush, comprising the steps of:
   supporting a cylindrical brush core for rotation around the central axis thereof;
   securing an elongated channel-shaped member to an external, circumferential surface of said core near one axial end thereof;
   causing said channel-shaped member to be wrapped around said core in a spiral having plural, substantially uniformly spaced flights, said channel-shaped member opening radially outwardly from said core;
   securing said channel member to said core;
   feeding into the groove defined by said channel-shaped member after it is engaged with said core a plurality of brush elements; and
   securing the radially inner ends of said brush elements within said channel-shaped member.

2. A method according to claim 1, further including the steps of:
   rigidly securing each flight of the channel-shaped member to said core; and
   dividing said core and the flights of said channel-shaped member along at least one plane defined by the axis and a radius of said core to form plural core segments.

3. A method according to claim 2, wherein said cylindrical brush core is hollow and divided into halves along a diametrical plane before the channel-shaped member is wrapped around said core; and
   wherein said core halves are held together by end bell means mounted upon a shaft extending concentrically through said core.

4. A method according to claim 3, wherein each flight is secured to said core in at least two places on both sides of and adjacent to said plane as said channel-shaped member is wrapped on said core and before said brush elements are fed into said groove.

5. A method according to claim 1, wherein a spiral recess is formed in the outer surface of said core and said channel-shaped member is disposed within said recess;
   wherein said core is divided into halves along a diametrical plane before said channel-shaped member is attached thereto; and
   wherein said core halves are held together by a pair of split end bells engaging the opposite ends of said core and secured to shaft means extending coaxially through said core.

6. A method according to claim 1, further including the steps of:
   preassembling said brush elements in, and uniformly distributed along, a second channel-shaped member;
   feeding said second channel-shaped member with said brush elements assembled therein into said first-mentioned channel-shaped member; and
   locking said second channel-shaped member within the groove defined by the first-mentioned channel-shaped member.

7. A method according to claim 1, further including the steps of:
   feeding a flexible cable-like element into the groove defined by the channel-shaped member for holding said brush elements within the groove, the channel-shaped member having flanges and a bottom wall extending therebetween, the central portion of said bottom wall being initially spaced from said core; and forcing said cable-like element against said central portion of said bottom wall, whereby the flanges of the channel member are deflected toward one another to pinch the brush elements therebetween.

8. A method of fabricating a rotary brush, comprising the steps of:
   forming an elongated channel-shaped member having a pair of flanges interconnected by a transversely curved web portion which projects slightly inwardly between the flanges;
   wrapping said channel-shaped member around an external circumferential surface of a cylindrical core in a spiral having plural flights, the channel-shaped member opening outwardly from the core;
   feeding into the groove of the channel-shaped member a plurality of brush elements; and
   deforming the web portion of the channel-shaped portion radially inwardly toward the circumferential surface of the core whereby the flanges of the channel-shaped member are deflected toward one another for pinching the brush elements therebetween.

9. A method according to claim 8, comprising the additional steps of:
   feeding into the groove an elongated cable-like member; and
   applying a tension to said elongated cable-like member as it is fed into said groove and around the cylindrical core to cause said radially inward deformation of the web portion, which simultaneously causes said relative deflection of the flanges.

10. A method according to claim 9, further including the step of securing the radially inner ends of the brush elements within the groove of the channel-shaped member by means of the elongated cable-like member.

11. A rotary brush construction, comprising;
    an elongated cylindrical core means;
    an elongated channel-shaped member wrapped around said core means to provide a plurality of spiral flights encircling said core means, said channel-shaped member having a pair of spaced side flanges extending outwardly from the circumferential surface of the core means and interconnected by a web having a center portion slightly spaced from the periphery of the core means;
    a plurality of elongated brush elements extending into the outwardly opening groove defined by the channel-shaped member; and
    an elongated locking means disposed within said groove for causing radial inward deformation of the center portion of the web whereby the side flanges of the channel-shaped member are relatively bent toward each other to pinch the brush elements therebetween.

12. A rotary brush construction according to claim 11, wherein the channel-shaped member further includes a lateral flange means integrally connected to the radially inner edges of one of said side flanges, said lateral flange means extending laterally away from said other side flange and being positioned in engagement with the circumference of said core means, and means for fixedly securing lateral flange means to said core means.

13. A brush construction according to claim 11, wherein the web of said channel-shaped member is initially arcuately and transversely curved inwardly between the spaced side flanges.

14. A rotary brush construction according to claim 11, wherein each of the side flanges has adjacent the free edge of its inner surface an elongated integral head, said beads extending inwardly toward one another and being adapted to contact and grip the brush elements therebetween.

15. A method according to claim 1, further including the steps of:
    preassembling said brush elements in, and uniformly distributed along, said channel-shaped member;
    attaching a plurality of channel-shaped segments to said core, said segments being spaced from each other and arranged to define a spiral path around said core;
    feeding said channel-shaped member with said brush elements assembled therein into said channel-shaped segments; and
    locking said channel-shaped member within the grooves defined by the channel-shaped segments.

References Cited

UNITED STATES PATENTS

| 3,193,865 | 7/1965 | Jones | 15—182 |
| 3,343,884 | 9/1967 | Hunt | 300—21 |

GRANVILLE Y. CUSTER, JR., Primary Examiner

U.S. Cl. X.R.

300—21